N. SHOCK.
Corn Sheller and Cleaner.
No. 82,039.
Patented Sept. 8, 1868.
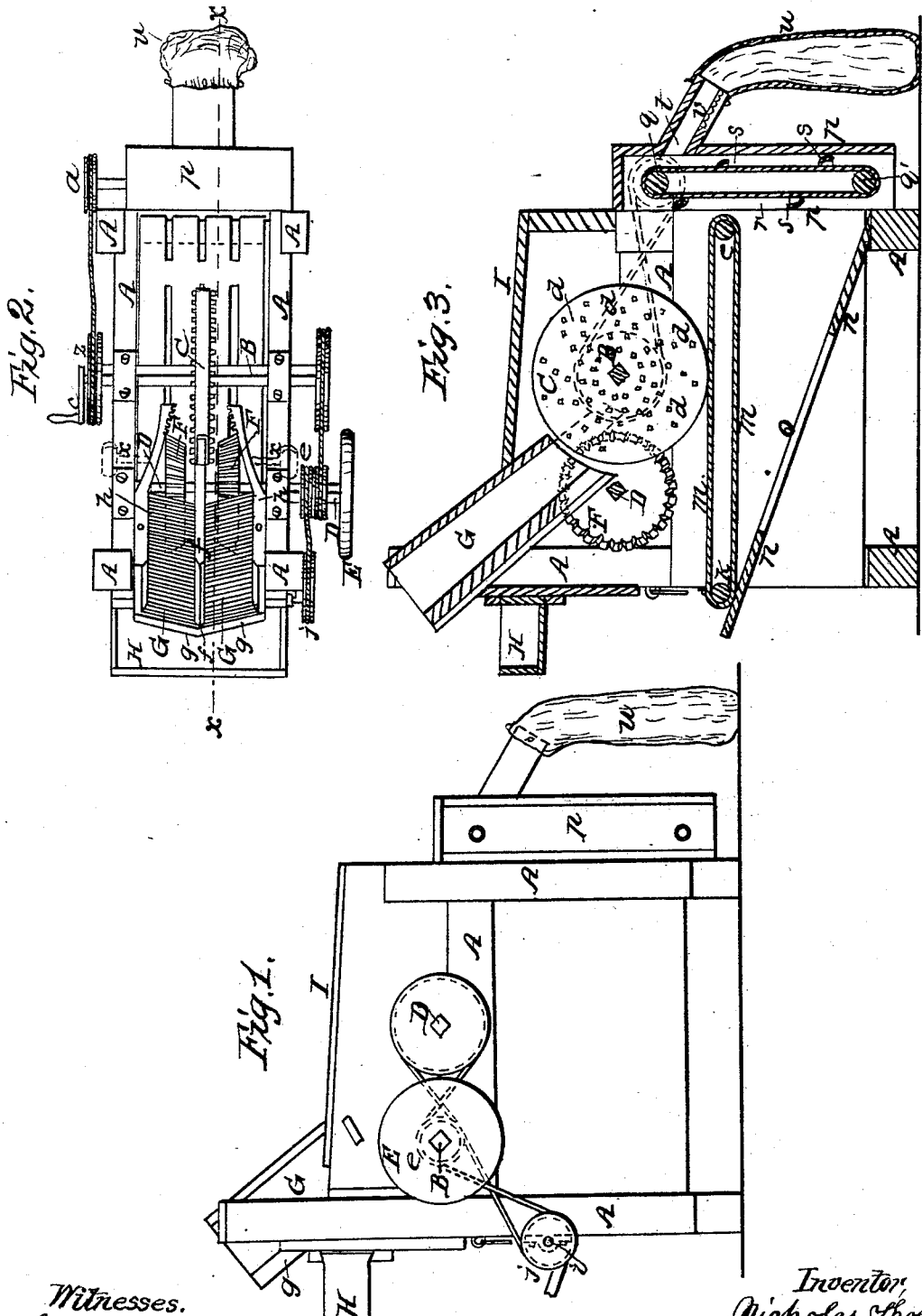

United States Patent Office.

NICHOLAS SHOCK, OF BALTIMORE, MARYLAND.

Letters Patent No. 82,039, dated September 8, 1868.

IMPROVEMENT IN CORN-SHELLER AND CLEANER.

*The Schedule referred to in these Letters Patent and making part of the same.*

TO ALL WHOM IT MAY CONCERN:

Be it known that I, NICHOLAS SHOCK, of Baltimore, in the county of Baltimore, and State of Maryland, have invented a new and useful Improvement in Corn-Sheller and Cleaner; and I do hereby declare that the following is a full, clear, and exact description thereof, reference being had to the accompanying drawings—

Figure 1 being a side elevation.

Figure 2, a bird's-eye view, the top or cover being removed.

Figure 3, a vertical longitudinal section.

To enable others skilled in the art to which it appertains to make and use my invention, I will proceed to describe its construction and operation.

I make the frame A of any desired size and proportion; I then place on or across it the main shaft B, which extends out on both sides of the machine a sufficient distance to receive the pulleys $a$ and $b$, and driving-crank $c$, or an extra pulley to propel the machine instead of the crank, on the respective ends of said shaft, and on the said shaft, about its centre, I place the disk C, having teeth on projections $d$, on each side of the same, extending from its surface about one-quarter of an inch, and of any desired shape and number, and placed in any proper position. The disk C may be made of iron or wood, and of any desired size.

I then place across the machine, at any desired distance in front of said shaft B, a shaft, D. This shaft extends out from the machine on the side opposite to the driving-crank $c$, or the pulley which may be used instead of the crank, far enough to receive the double pulley $e$, and outside of it the fly-wheel E. The shaft D is so placed that the periphery of the disk C comes in close proximity therewith, but far enough from it to prevent the grains of corn from being broken by passing between them; and on this shaft D, I place two disks, F, made of wood or iron, and having their peripheries bevelled, as shown in fig. 2, and grooved, serrated, or toothed, for the purpose of taking hold on the corn which is being shelled. Their disks, F, are so placed on their shaft that they will revolve, one on each side of the disk C, and just far enough from it to allow the grains of corn to pass between them without being broken or injured.

I place a double hopper or spout, G, as shown, in such position as to receive the ears of corn into its upper end, and conduct them down endwise to the peripheries of the disks F respectively, the division-board $f$ of this double feed-spout being just opposite the edge or periphery of the disk C. The bottom or under-board, $g$, of this double spout or hopper is so made that it corresponds with the bevels of the peripheries of the two disks F; that is, it, instead of being flat, or on a straight line, transversely, is depressed as it approaches the partition $f$, and this depression is about equal to the bevel of the periphery of the disks F.

The sides $h$ are not parallel to the sides of the machine, but are made to approach the centre as they descend, as shown in fig. 2, and their lower ends are serrated or grooved, also shown in fig. 2.

I place a shaft, $i$, across the front of the machine, as seen in figs. 1 and 3. On the outer end of this shaft is placed a pulley, $j$, for the purpose of driving the same. I place a roller, $k$, seen in fig. 3, on this shaft, and another roller, $l$, seen also in fig. 3, is placed near the other end of the machine.

Around these two rollers is stretched a revolving apron, which carries off the cobs and grain, as seen in figs. 2 and 3. Under this apron I place a chute-board, $n$, for grain. In this is placed a screen, $o$. At the lower end of said chute-board is a casing for elevators, shown at $p$, fig. 3, the lower end of which casing is so placed that the grain descending on the board $n$ is deposited therein. Across the casing $p$ are two shafts $q\ q'$, and motion is given them by the pulley $a$, which is on one end of the upper shaft $q$. On these shafts is an endless band or apron, $r$, attached to which are elevator-buckets or cups $s$. As the band $r$ revolves, when each bucket or cup reaches the bottom of the case $p$, where the grain is, it fills itself, and passes up and over the upper shaft $q$, and discharges into the spout $t$, in the end of which are hooks or pins, to which the bag is suspended. In the bottom of the spout $t$ is a screen, $v$, which allows any dirt that may be in the grain to fall through outside instead of passing into the bag. At the front end of the machine, and just under the upper end of the feed-spout G, is placed a box, H, into which the corn to be shelled is placed for the purpose of convenience in feeding the same into the machine.

I make a cap, I, to extend from end to end and from side to side of the machine, thus covering the internal works, and keeping the shelled corn from flying out of the machine. Through the sides of this cover I place the set-screws x x, the ends of which press against the lower and serrated ends of the side-pieces h of the feed-spout G. By this means the serrated side-pieces of the feed-spout can be set up toward the disk C, so as to give any desired pressure to the ears of corn between them.

The operation of the machine is as follows, viz, the machine being put in motion in any desired manner, the corn to be shelled is placed in box H, and from it fed to the machine by dropping the ears end foremost into the double feed-spout G, down which they slide until they come in contact with the disks F F and C, where the corn is quickly shelled from the cob, both following on the revolving apron m, by which they are carried back over the roller K, the cobs passing over the upper end of the chute-board n, while the corn falls thereon, and is by it carried down to the bottom of the elevator-casing p, and deposited therein. In passing down the said chute, it passes over the screen o, by which it is relieved of all impurities smaller than the grains of corn. In the bottom of the elevator-casing p, it is taken up by the elevator-buckets s, carried up and over the roller q, and thrown into the spout t, and is thereby carried down over a second screen, v, and discharged into the bag or sack u, which is attached to said spout t, or, if desired, it may be discharged on the floor, without the use of the sack.

Having thus fully described the construction and use of my invention, what I claim, and desire to secure by Letters Patent, is—

1. The combination of the serrated disks F F and feed-spout G, substantially as shown and described.

2. The combination of the toothed disk C, the revolving apron m, and chute-board n, all as shown and described.

3. The combination of the chute-board n, the elevator, and the spout t, substantially as shown and described.

4. The combination of toothed disk C and the chute-board n, substantially as shown and described.

NICHOLAS SHOCK.

Witnesses:
    WM. KIDD,
    F. T. DARLING.